United States Patent
Magerl et al.

(10) Patent No.: US 10,199,941 B2
(45) Date of Patent: Feb. 5, 2019

(54) RESONANT CONVERTER HAVING A TRANSFORMER WITH CENTRAL POINT TAP

(71) Applicant: FRONIUS INTERNATIONAL GmbH, Pettenbach (AT)

(72) Inventors: Christian Magerl, Langschlag (AT); Franz Peter Musil, Steinerkirchen a. d. Traun (AT); Robert Eberl, Linz (AT); Friedrich Steinmaurer, Steinbach am Ziehberg (AT)

(73) Assignee: FRONIUS INTERNATIONAL GmbH, Pettenbach (AT)

( * ) Notice: Subject to any disclaimer, the term of this patent is extended or adjusted under 35 U.S.C. 154(b) by 0 days.

(21) Appl. No.: 15/556,925

(22) PCT Filed: Mar. 1, 2016

(86) PCT No.: PCT/EP2016/054326
§ 371 (c)(1),
(2) Date: Sep. 8, 2017

(87) PCT Pub. No.: WO2016/142218
PCT Pub. Date: Sep. 15, 2006

(65) Prior Publication Data
US 2018/0034371 A1    Feb. 1, 2018

(30) Foreign Application Priority Data
Mar. 9, 2015    (AT) .................................. 50187/2015

(51) Int. Cl.
*H02M 3/335*    (2006.01)
*H02M 3/158*    (2006.01)
(Continued)

(52) U.S. Cl.
CPC ........... *H02M 3/1588* (2013.01); *B23K 11/26* (2013.01); *H02M 3/335* (2013.01);
(Continued)

(58) Field of Classification Search
CPC .... H02M 3/158; H02M 3/1588; H02M 3/335; H02M 3/33507; H02M 3/33569; H02M 3/33592
See application file for complete search history.

(56) References Cited

U.S. PATENT DOCUMENTS 3,362,900 A    1/1968    Sarins
4,164,016 A    8/1979    Schuchard
(Continued)

FOREIGN PATENT DOCUMENTS

DE    2 849 170    2/1980
DE    102011076573    11/2012
(Continued)

OTHER PUBLICATIONS

Austria Search Report conducted in counterpart Austria Appln. No. A50187/2015 (dated Dec. 18, 2015).
(Continued)

*Primary Examiner* — Matthew Nguyen
(74) *Attorney, Agent, or Firm* — Greenblum & Bernstein, P.L.C.

(57) ABSTRACT

In order to set the output voltage of a resonant converter to a desired value by means of a simple additional circuit while the resonant converter is in open circuit operation, it is intended that at least one capacitor each (C1, C2) is connected in parallel to the electrical switching elements (S1, S2) of the secondary side of the resonant converter (1).

6 Claims, 4 Drawing Sheets

(51) Int. Cl.
*B23K 11/26* (2006.01)
*H02M 1/00* (2006.01)

(52) U.S. Cl.
CPC .. *H02M 2001/0058* (2013.01); *Y02B 70/1433* (2013.01); *Y02B 70/1491* (2013.01)

(56) References Cited

U.S. PATENT DOCUMENTS

| | | | | |
|---|---|---|---|---|
| 4,860,184 | A | * | 8/1989 | Tabisz .................. H02M 3/155 363/132 |
| 5,406,051 | A | | 4/1995 | Jin-Sheng |
| 5,926,381 | A | | 7/1999 | Haruo et al. |
| 6,288,919 | B1 | | 9/2001 | Jain |
| 8,451,629 | B2 | * | 5/2013 | Adragna ............. H02M 3/3376 323/288 |
| 8,804,377 | B2 | * | 8/2014 | Adragna ............. H02M 3/3376 363/21.02 |
| 2012/0287680 | A1 | | 11/2012 | Luo et al. |
| 2012/0327962 | A1 | * | 12/2012 | Stultz ................... H01S 3/0612 372/29.02 |
| 2013/0112675 | A1 | | 5/2013 | Peters |
| 2014/0126247 | A1 | | 5/2014 | Koch et al. |
| 2015/0009717 | A1 | * | 1/2015 | Chen ................. H02M 3/33507 363/21.02 |
| 2015/0023066 | A1 | * | 1/2015 | Kawashima ...... H02M 3/33553 363/21.02 |

FOREIGN PATENT DOCUMENTS

| | | |
|---|---|---|
| JP | H06311743 | 11/1994 |
| JP | H11-41939 | 2/1999 |
| JP | 2014-050220 | 3/2014 |

OTHER PUBLICATIONS

Int'l Preliminary Report on Patentability (Form PCT/IPEA/409) in PCT/EP2016/054326) (dated Sep. 14, 2017).
Notification of Reasons for Refusal conducted in counterpart Japan Appln. No. 2017-547503 (dated Sep. 4, 2018) (w/ English language translation).

* cited by examiner

RESONANT CONVERTER HAVING A TRANSFORMER WITH CENTRAL POINT TAP

The invention at hand relates to a resonant converter with a transformer with center tap and a resonant circuit, wherein the center point of the secondary side of the transformer is connected via a first output line to a first output terminal, and the two outer connections of the secondary side of the transformer are connected each via a switching element and via a second output line to a second output terminal, and the method for operating the resonant converter.

Figure 1:
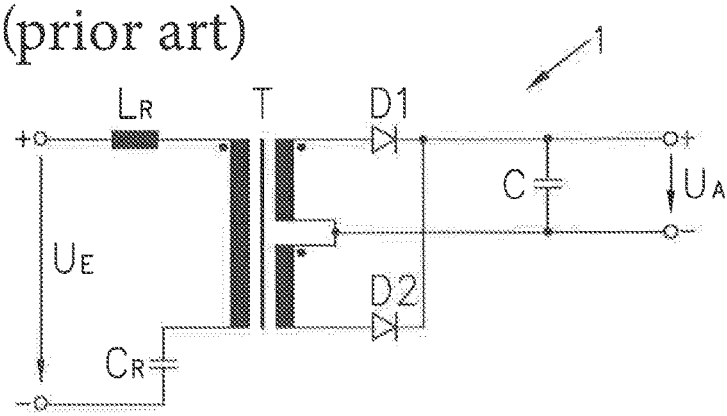

Current converters, such as, for example, resonant switching converters 1, etc. are often used on the secondary side in transformers with center tap. An example of the above is a current converter 1 in form of a known resonant converter, as shown in FIG. 1, where a choke $L_R$, capacitance $C_R$ and the primary side of the transformer T form a resonant circuit. A pulse pattern at the input $U_E$ excites the resonant converter to oscillate. The pulse pattern can be implemented, for example, by a known circuit arrangement and a PWM controller (not shown in FIG. 1). Said oscillation is transmitted via transformer T and rectified on the secondary side.

Certain resonant converters 1, such as serial-parallel resonant converters, also have the ability that the output voltage $U_A$ increases during open circuit operation (thus without connected load) in such a way due to the resonant circuit formed with $C_P$ that regulation of the resonant converter 1 with an additional circuit 7 (FIG. 3) on the output side is advantageous. This is especially the case for welding power sources where the maintenance of a certain output voltage $U_A$ is desired even during open circuit operation. For this purpose, the resonant converter 1 is operated in a pulsed fashion during open circuit operation. For this purpose, at the input $U_E$ of the resonant converter voltage pulses are applied for a certain period of time. The oscillation generated by the resonant converter 1 charges the smoothing capacitor C3 on the secondary side via the diode D3. In the period in which no voltage pulses are applied, the smoothing capacitor C3 discharges itself via the resistor R1. Thus, at the output of the resonant converter 1 a medium output voltage $U_A$ arises, which can be kept at a desired level by setting the voltage pulses at the input. During normal operation of the resonant converter 1 this additional circuit 7 has no influence. Nevertheless, the smoothing capacitor C3 has to be designed for the maximum output voltage $U_A$ and a maximum pulse frequency and thus has to be dimensioned in a sufficiently large capacity, requiring a certain amount of space on the circuit carrier 3.

Figure 2:
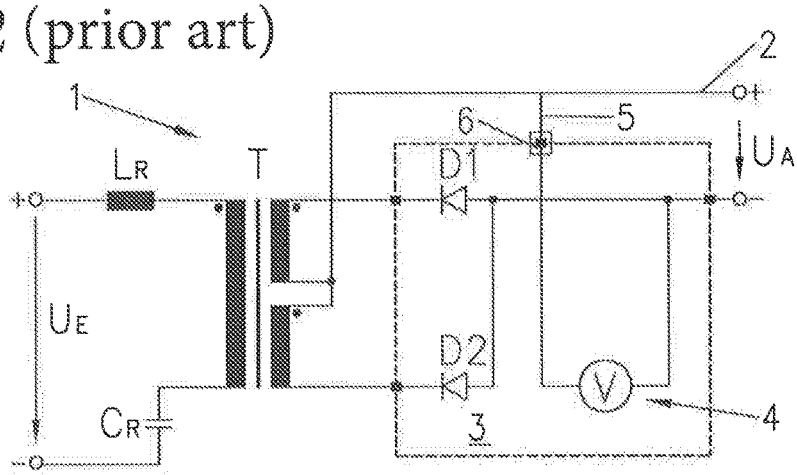

The switching elements on the secondary side of the resonant converter 11 are usually disposed on a substrate 3, such as, for example, a circuit board (as shown in FIG. 2), or the like. However, the circuit elements can also be connected by means of copper stirrups (particularly for very high currents or voltages). To avoid having to route the live positive output line 2 of the resonant converter 1 via the substrate 3, which would require a large copper cross-section on the substrate 3, the positive output line 2 is typically routed to the exterior as a separate line, not via a substrate where a voltage measurement 4 for measuring the output voltage $U_A$ (FIG. 2) or the additional circuit 7 (FIG. 3) is implemented. However, this means it is necessary for the positive output line 2 to be connected to the substrate 3 by means of an additional connecting line 5. To this end, a bush 6 is disposed on the circuit board 3 where the connecting line 5 is connected. However, the additional connecting line 5 and the necessity of providing a bush 6 on the substrate 3 naturally also increase the complexity of the electrical assembly. By analogy, the same applies when copper stirrups are used because, according to the prior art, a connecting line 5 is required connecting the positive output line 2 to the additional circuit 7.

U.S. Pat. No. 6,288,919 B1 depicts such a resonant converter that uses a smoothing capacitor at the output that connects the center point as positive output line with the additional circuit. In addition, two capacitors are used in parallel to the switching elements in order to facilitate a quick decay of the current flow in the switching elements.

Aside from the above, the connecting line 5 may become detached over time or the assembler may forget connecting the connecting line 5 with the substrate 3 or the positive output line altogether. Both instances may result in a failure of the resonant converter. Specifically, if the connecting line 5 is omitted, excess voltage at the diodes D1, D2 may result and destroy them. Therefore, foregoing this additional connecting line 5, which is indeed an error source, is desirable.

It is therefore an object of the present invention to ensure that the output voltage during open circuit operation of the resonant converter can be set to the desired value while avoiding the above-stated circuitry issues by means of a simple additional circuit.

Figure 3:
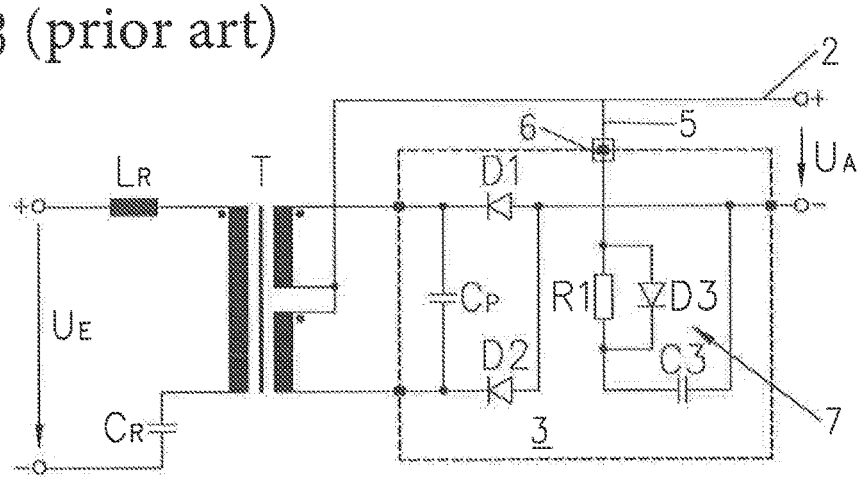

According to the invention, this object is achieved in that between a first output terminal and a second output terminal there is an output voltage so that the first output terminal is guided to the outside directly via the first output line without an additional circuit in the form of a smoothing capacitor on the output side between the first output terminal and the second output terminal and that in parallel to the electrical switching elements a capacitor each is connected in order to maintain the output voltage of the resonant converter during open circuit operation. The capacitors during normal operation (thus with a connected load) now only have to carry half a period of power each and thus can have smaller dimensions than in the circuit according to the prior art (FIG. 3). As a result, a potential circuit carrier can also be of a smaller dimension. With this, the connecting line between the first output terminal and the circuit carrier, necessary until now, can thus also be omitted. Since the center point is guided to the outside via the first output line in form of the first output terminal and it is not connected any further (in particular, a smoothing capacitor between the first output terminal and the second output terminal is omitted), in an advantageous fashion a connection of the center point to the additional circuit of the secondary side of the resonant converter may be omitted. With this, a potential source of error in the form of the above-mentioned connecting lines to connect the center point to the additional circuit of the secondary side (for example on a circuit carrier, or via a copper band, etc.) is excluded from the start.

For a faster discharge of the capacitors, at least one discharge resistor can be connected each in parallel to the electrical switching elements in an advantageous fashion.

The output voltage of the resonant converter can be measured in an especially advantageous fashion if between the two outer connections at least two resistors are connected in series to form a measuring point between the two resistors, and a voltage measuring unit is intended, measuring voltage between the measuring point and the second output terminal corresponding with the output voltage between the first output terminal and the second output terminal. With this, the output voltage can be measured without requiring a connecting line between the first output terminal and the voltage measuring unit as described in the prior art (FIG. 2). Measuring of the output voltage also makes it possible to regulate the open circuit voltage during open circuit operation.

If at least one further resistor is connected between the measuring point and the second output terminal, due to the emerging voltage divider the voltage range of the voltage measuring unit can be decreased at the input. With this, the voltage measuring unit can be designed in an advantageous fashion to have a lower measuring voltage.

Figure 4:
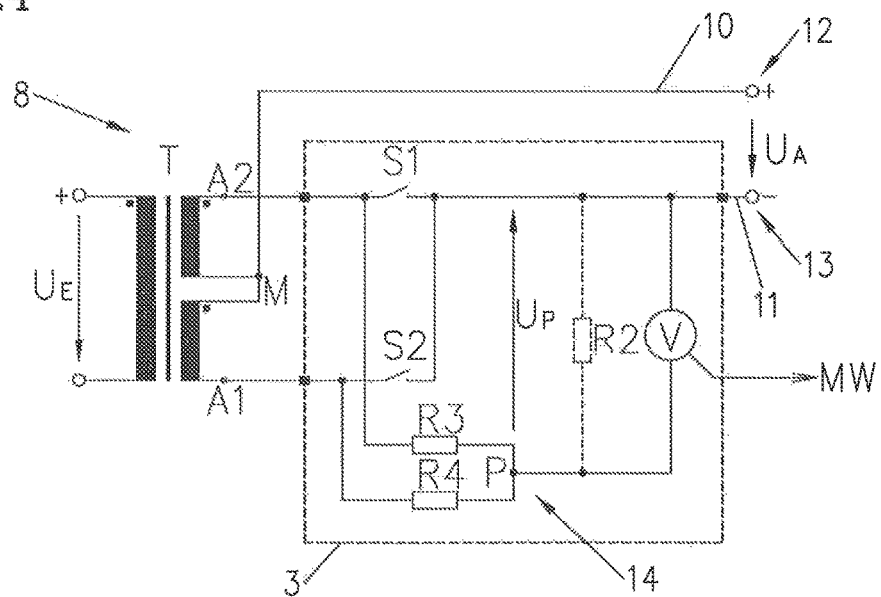
Figure 5:
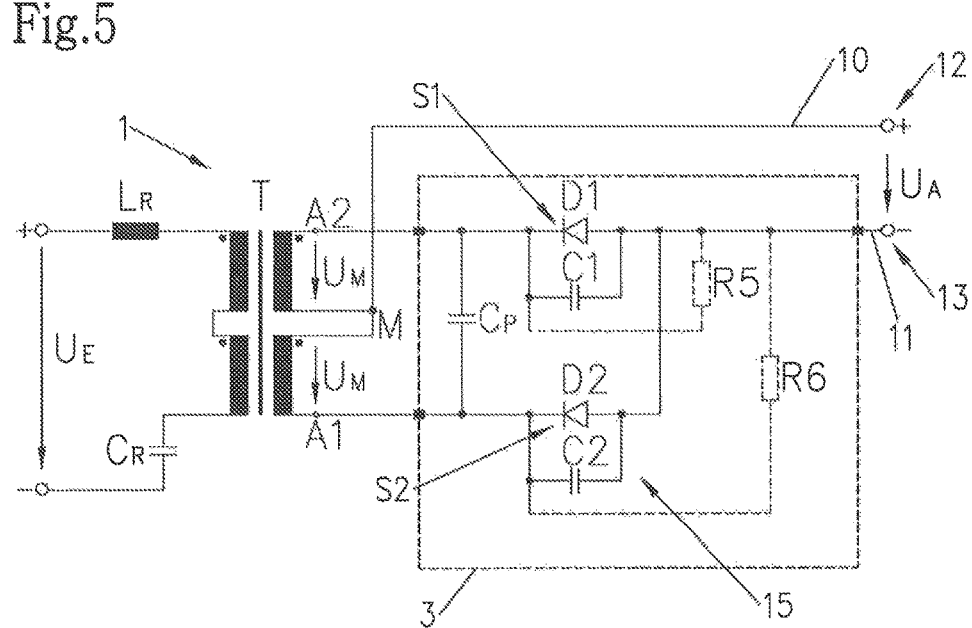
Figure 6:
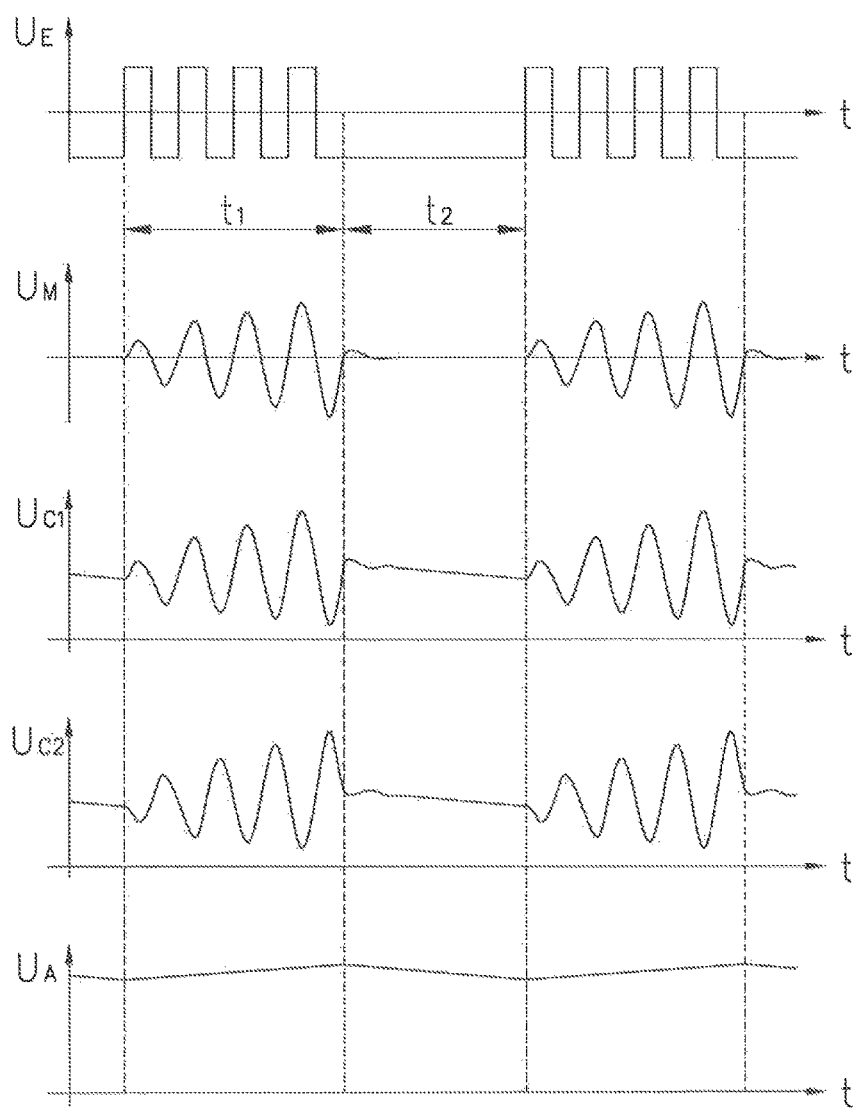
Figure 7:
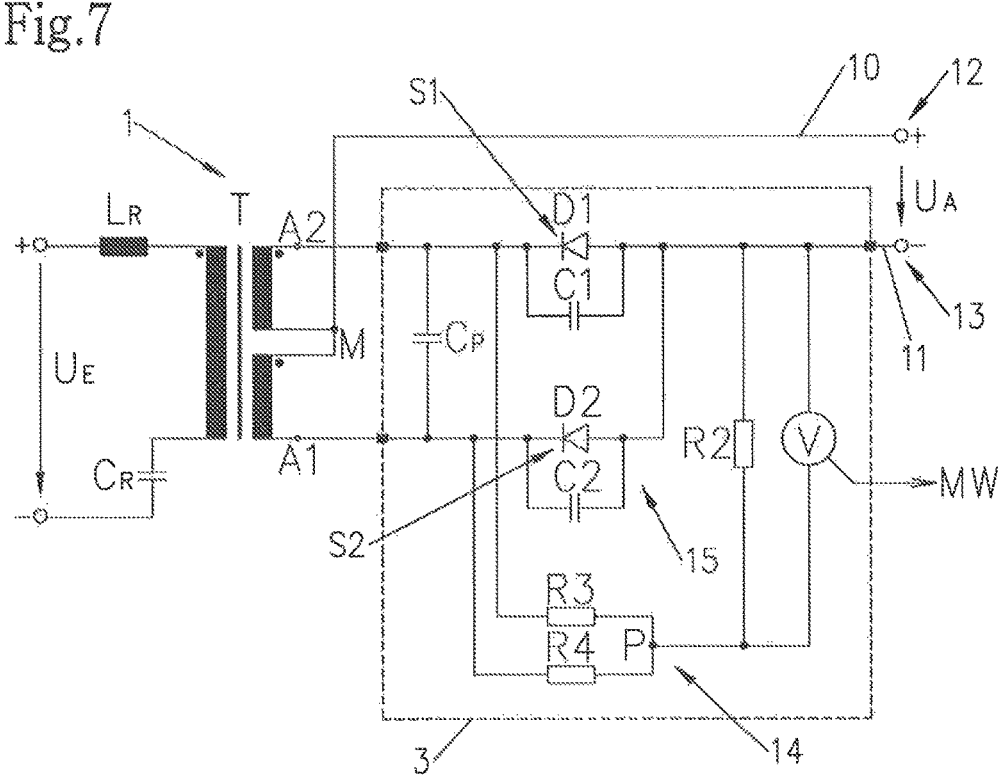

The present invention will be described in further detail below referring to FIGS. 1 to 7, which demonstrate advantageous embodiments of the invention that are exemplary and schematic in nature and not intended to limit the scope of the invention. Shown are:

FIG. 1, showing a typical resonant converter according to the prior art;

FIG. 2, showing a voltage measurement that is customary in the prior art taken at the secondary side of a transformer with center tap;

FIG. 3, showing the additional wiring customary in the prior art for controlling the output voltage of a series-parallel resonant converter in the no-load state;

FIG. 4, showing a circuit arrangement with a transformer with center tap and voltage measurement of the output voltage according to the invention;

FIG. 5, showing a series-parallel resonant converter with secondary wiring for adjusting the no-load voltage;

FIG. 6, showing the voltage curves resulting in the series-parallel resonant converter in the no-load state; and FIG. 7, showing a series-parallel resonant converter having the measurement apparatus according to the invention for measuring voltage and the secondary wiring for controlling the output voltage in the no-load state.

FIG. 4 shows a circuit arrangement 8 having a transformer T with center tap on the secondary side. The secondary side of the transformer T with center tap has at least three connections: one for the center point M and two at the ends of the windings on the secondary side, wherein these connections are designated as outer connection.

But it is noted in general that a transformer with center tap within the meaning of the invention also includes the use of two or more transformer windings with a joint core, which have the windings on the secondary and primary sides each connected in series (see FIG. 5). Independent transformers with primary windings connected in parallel and secondary windings connected in series are also included. An electrical connection between two windings connected in series on the secondary side then corresponds to the center point M where the first output line 10 can be connected.

The center point M on the secondary side is routed to the outside via the first output line 10, here a positive output line, as a first output terminal 12, here the positive terminal. The first output line 10 therein is not routed via a substrate 3, as, for example, a circuit board, but directly as a line to the outside. In this context, a smoothing capacitor between the first output terminal 12 and the second output terminal 13 is omitted on the output side. The two outer, not series-connected, connections A1, A2 of the secondary side of the transformer 1 are each routed in a manner known in the art to a first connection of a circuit element S1, S2. The respectively second connections of the circuit elements S1, S2 are connected to each other and form the second output terminal 13, here the negative terminal, of the rectifier that is routed to the outside with a second output line 11, here a negative output line.

If passive circuit elements in the form of diodes are used as electrical circuit elements S1, S2, a known center point rectifier is obtained. If active circuit elements in the form of, for example, semiconductor switches, such as, e.g., MOS-FETs, are used as electrical circuit elements S1, S2, a known synchronous rectifier is obtained. As the features of center point rectifiers and synchronous rectifiers are well known in the art and immaterial for purposes of the present invention, they will not be addressed in further detail.

The circuit elements S1, S2 are disposed on the substrate 3 as is customary in the art. Naturally, the substrate 3 can be configured as divided. Particularly in the case of active circuit elements S1, S2, the power part with the active circuit elements S1, S2 is often disposed on a separate substrate 3. In addition, an electric measurement apparatus 14 is additionally disposed on the substrate 3 for measuring the output voltage $U_A$. However, the circuit elements of the secondary side can also be connected to each other by means of copper stirrups. A combination circuit arrangement on the secondary side with a substrate 3 and copper stirrups is also conceivable. For example, the measurement apparatus 14 for measuring the output voltage $U_A$ could be disposed on a substrate 3, and the remainder of the circuit elements could be connected by means of copper stirrups.

Said measurement apparatus 14 for measuring the output voltage U1, substantially has two resistors R3, R4 that are series-connected between the two outer connections A1, A2 of the secondary side of the transformer T. This way, a measurement point P is created between the two resistors R3, R4, which features a voltage $U_P$ opposite the second output terminal 13 that corresponds to the output voltage $U_A$ applied to the center point M. Said measurement $U_P$ as the measurement point P can be measured by any voltage measurement unit V and provided as an analog or digital measured value MW. For example, the voltage measurement unit V can be configured as an amplifier circuit with an operational amplifier, wherein the output of the amplifier circuit is digitized in an analog-digital transformer and routed to the outside as the digital measured value MW.

If the two resistors R3, R4 are equal, the voltage $U_P$ at the measurement point P corresponds to the output voltage $U_A$ at the center point M, meaning, in the shown embodiment of the voltage, at the first output terminal 12. If the resistors R3, R4 are not equal, a voltage that corresponds to the ratio of the resistors R3, R4 becomes manifest at the measurement point P. In both cases, it is thus possible to measure the output voltage $U_A$ at the measurement point P by measuring the voltage $U_P$ of the measurement point P opposite the second output terminal 13, as hinted at in FIG. 4.

The voltage $U_P$ at measurement point P can be measured directly; but a measurement by means of a voltage divider is also conceivable. This allows for the use of a voltage measurement unit V with a reduced input range, thereby achieving technical circuit simplifications. To this end, it is possible to create a voltage divider between the measurement point P and the second output terminal 13 by means of an additional resistor R2, as hinted at in FIG. 4. The resistor R2 therein, in conjunction with the resistors R3 and R4, achieves a corresponding reduction of the voltage $U_P$ at the measurement point P that, however, is still proportionate relative to the output voltage $U_A$. If the voltage measurement unit V requires a still lesser input voltage, it is possible to distribute the resistor R2 at an appropriate ratio over two resistors to achieve an adjustment to the input voltage range of the voltage measurement unit V.

This means, when using a measurement apparatus 14 for the measurement of the voltage of the output voltage $U_A$, it follows, correspondingly, that routing the first output line 10 via the substrate 3 or connecting the first output line 10, as seen in the prior art, to the substrate 3 or the voltage measurement unit V via an additional connecting line 5 is no longer necessary.

FIG. 5 shows a series-parallel resonant converter 1 with a series oscillator circuit on the primary side consisting of a choke $L_R$, vibrating capacitor $C_R$ and the primary side of the transformer T, a parallel oscillator circuit on the secondary side consisting of vibrating capacitor $C_P$ and the secondary side of the transformer T, and a center point rectifier (meaning with diodes D1, D2 as electrical circuit elements S1, S2) on the secondary side. The primary side is not completely displayed in the present figure; particularly, the electrical circuit for generating the shown input voltage $U_E$, which is known in the art, has been omitted. It is understood that the oscillator circuit on the primary side can also be configured as a parallel oscillator circuit, which is known in the art, where the vibrating capacitor $C_R$ is, for example, connected in parallel relative to the primary side of the transformer T. Similarly, the oscillator circuit can be configured differently or not at all on the secondary side, which is also known in the art. Similarly, the oscillator circuit on the secondary side could be configured differently or not at all, which also known in the art. Likewise, the polarity of the diodes D1, D2 can be reversed, or the same could be replaced with other electrical circuit elements S1, S2.

To maintain the output voltage $U_A$ at a desired value in a no-load state, a secondary wiring 15 is intended according to the invention wherein at least one capacitor C1, C2 is connected parallel relative to the electrical circuit elements S1, S2, here diodes D1, D2. Therefore no separate connection is necessary between the first output line 10 and substrate 3 for the secondary wiring 15 for adjusting the no-load voltage.

A desired output voltage $U_A$ is to be maintained in the no-load state on the resonant converter 1. To this end, voltage pulses are applied for a specified time span $t_1$ on the primary side of the transformer T that excite the resonant circuit on the primary side. The excitation results in an oscillation on the secondary side of the transformer T. In the no-load state, the voltages that are applied to the capacitors C1, C2 also vibrate around the level of the output voltage $U_A$. The capacitors C1, C2 are thereby charged during the excitation on the primary side for the time span $t_1$ which also results in an increase of the no-load voltage at the output $U_A$. The excitation on the primary side is then interrupted for a second time span $t_2$. During this phase, the capacitors C1, C2 are discharged. To this end, it is possible to provide the discharge resistors R5, R6, as hinted at in FIG. 5. Without the discharge resistors R5, R6, the capacitors C1, C2 are discharged according to their self-discharge characteristics. If the secondary wiring 15 is implemented together with the measurement apparatus 14 for measuring the output voltage $U_A$ (see FIG. 7), the resistors R2, R3, R4 of the measurement apparatus 14 serve simultaneously as bleeder resistors. During the discharge action of the capacitors C1, C2, the no-load voltage $U_A$ decreases at the output. A medium output voltage $U_A$ at the output during open circuit operation is the result. This means by adjusting the voltage pulses $U_E$, pulse frequency and time spans $t_1$, $t_2$, it is possible to maintain the output voltage $U_A$ at a desired value. During normal operation (with a connected load at the output), this secondary wiring 15 is without influence. The voltage curves in the no-load state that result, for example, at a series-parallel resonant converter are depicted schematically in FIG. 6.

The two capacitors C1, C2 of the secondary wiring 15 therein can feature smaller dimensions than what has been the case with the smoothing capacitor C3 in the usual circuit according to the prior art (see FIG. 3). This also allows for saving space on the substrate 3 by omitting the smoothing capacitor C3. Aside from this, it is now also possible to reduce the thermal load of the substrate 3, which also results in a possible size reduction of the substrate.

The smaller capacitance values C1, C2 compared to the smoothing capacitor C3, however, also cause in addition that the output voltage $U_A$ to decreases more quickly in the no-load state, which is especially advantageous for applications in welding current sources, because it is thereby possible to reach the permitted maximum voltage after the end of the welding action more quickly.

Of course, the measurement apparatus 14 for measuring voltage and the secondary wiring 15 for controlling the output voltage $U_A$ in the no-load state can also be combined, as shown in FIG. 7, using a resonant converter 1 with center point rectifier. A combination of this kind is particularly advantageous because, this way, it is possible to regulate the output voltage $U_A$ also in the no-load state (no-load voltage) to have a desired value by measuring the voltage $U_P$ at the measurement point P that corresponds to the output voltage $U_A$, and/or it is possible to ensure a desired value of the no-load voltage.

The invention claimed is:

1. A resonant converter comprising:
   a transformer with center tap; and
   a resonant circuit comprising a primary winding of the transformer in series with a capacitor and in series with an inductor,
   a center point of a secondary side of the transformer being connected via a first output line to a first output terminal, and
   two outer connections of the secondary side of the transformer being connected each via an electrical switching element and being connected via a second output line to a second output terminal,
   wherein, between the first output terminal and the second output terminal there is an output voltage so that the first output terminal is guided to the outside directly via the first output line without any additional circuit between the first output terminal and the second output terminal in the form of a smoothing capacitor on the output side, and
   wherein at least one capacitor is connected in parallel to the electrical switching elements in order to maintain the output voltage when the resonant converter is in open circuit operation.

2. The resonant converter according to claim 1, further comprising at least one discharge resistor connected in parallel to the electrical switching elements.

3. The resonant converter according to claim 1, further comprising:
   at least two series-connected resistors are connected between the two outer connections of the secondary side of the transformer, wherein a measurement point is formed between the at least two series-connected resistors; and
   a voltage measuring unit configured for measuring a voltage between the measuring point and the second output terminal, which corresponds to the output voltage between the first output terminal and the second output terminal.

4. The resonant converter according to claim 3, further comprising at least one further resistor being connected between the measurement point and the second output terminal.

5. The resonant converter according to claim 1, further comprising a capacitor coupled to the two outer connections of the secondary side of the transformer.

6. A method for operating a resonant converter that includes a transformer with center tap and a resonant circuit with a primary winding of the transformer in series with a capacitor and in series with an inductor, comprising:
   creating an output voltage between a first output terminal connected to a center point of a secondary side of the transformer and a second output terminal connected to two outer connections of the secondary side of the transformer via respective electrical switching elements, and
   maintaining an output voltage when the resonant converter is in open circuit operation via capacitors connected in parallel to the electrical switching elements.

* * * * *